United States Patent
Whitley et al.

(10) Patent No.: US 11,618,642 B2
(45) Date of Patent: Apr. 4, 2023

(54) VEHICLE RESTRAINT SYSTEMS AND METHODS

(71) Applicant: ASSA ABLOY Entrance Systems AB, Landskrona (SE)

(72) Inventors: L. Blake Whitley, Arlington, TX (US); Jordan Ball, Sussex, WI (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 0 days.

(21) Appl. No.: 17/404,732

(22) Filed: Aug. 17, 2021

(65) Prior Publication Data
US 2022/0055848 A1 Feb. 24, 2022

Related U.S. Application Data

(60) Provisional application No. 63/068,261, filed on Aug. 20, 2020.

(51) Int. Cl.
*B65G 69/00* (2006.01)
(52) U.S. Cl.
CPC .................. *B65G 69/003* (2013.01)
(58) Field of Classification Search
CPC ................................... B65G 69/003
See application file for complete search history.

(56) References Cited

U.S. PATENT DOCUMENTS

| | | | |
|---|---|---|---|
| 2,801,011 A | 7/1957 | Hans et al. | |
| 3,305,049 A | 2/1967 | Willey | |
| 4,207,019 A | 6/1980 | Cone | |
| 4,208,161 A | 6/1980 | Hahn et al. | |
| 4,264,259 A * | 4/1981 | Hipp | B65G 69/003 414/401 |
| 4,282,621 A | 8/1981 | Portz | |
| 4,400,127 A * | 8/1983 | Metz | B65G 69/003 14/71.1 |
| 4,443,150 A | 4/1984 | Hahn et al. | |
| 4,472,099 A | 9/1984 | Hahn et al. | |
| 4,555,211 A * | 11/1985 | Metz | B65G 69/003 14/71.1 |

(Continued)

FOREIGN PATENT DOCUMENTS

| | | |
|---|---|---|
| CA | 2234974 A1 | 10/1999 |
| CA | 2297384 C | 2/2001 |

(Continued)

OTHER PUBLICATIONS

Automatic Wheel Restraint Surface Mounted User's Manual, Apr. 2006, SPX Dock Products, Inc., 44 pages.

(Continued)

*Primary Examiner* — Mark C Hageman
(74) *Attorney, Agent, or Firm* — Perkins Coie LLP

(57) ABSTRACT

Provided herein are vehicle restraint systems for releasably securing a vehicle having a RIG bar to a loading dock. The vehicle restraint systems can include a vehicle engagement member, such as a restraint hook, that is configured to engage RIG bars having a variety of geometries, including conventional RIG bars having a square cross-sectional area and modified RIG bars having more complex geometries. The engagement member can include an engagement region having a scallop feature configured to provide clearance for the RIG bars during engagement.

18 Claims, 10 Drawing Sheets

(56) References Cited

U.S. PATENT DOCUMENTS

| | | |
|---|---|---|
| 4,560,315 A | 12/1985 | Hahn |
| 4,605,353 A | 8/1986 | Hahn et al. |
| 4,634,334 A | 1/1987 | Hahn et al. |
| 4,664,582 A | 5/1987 | Edmeads |
| 4,674,941 A | 6/1987 | Hageman |
| 4,679,974 A | 7/1987 | Blunden |
| 4,695,216 A | 9/1987 | Erlandsson |
| 4,759,678 A | 7/1988 | Hageman |
| 4,784,567 A | 11/1988 | Hageman et al. |
| 4,815,918 A | 3/1989 | Bennett et al. |
| RE32,968 E | 6/1989 | Hahn |
| 4,861,217 A | 8/1989 | Erlandsson |
| 4,865,508 A | 9/1989 | Carlson |
| 4,915,568 A | 4/1990 | West |
| 4,938,647 A | 7/1990 | Erlandsson |
| 4,969,792 A | 11/1990 | Ellis et al. |
| 4,973,213 A | 11/1990 | Erlandsson |
| 4,988,254 A | 1/1991 | Alexander |
| 5,026,242 A | 6/1991 | Alexander |
| 5,071,306 A | 12/1991 | Alexander |
| 5,096,359 A | 3/1992 | Alexander |
| 5,120,181 A | 6/1992 | Alexander |
| 5,212,846 A | 5/1993 | Hahn |
| 5,249,905 A | 10/1993 | Warner et al. |
| 5,259,718 A | 11/1993 | Alexander |
| 5,297,921 A | 3/1994 | Springer et al. |
| 5,336,033 A | 8/1994 | Alexander |
| 5,346,353 A | 9/1994 | Alexander |
| 5,375,965 A | 12/1994 | Springer et al. |
| 5,454,682 A | 10/1995 | Alexander |
| 5,505,575 A * | 4/1996 | Alexander ............ B65G 69/003 414/584 |
| 5,531,557 A | 7/1996 | Springer |
| 5,553,987 A | 9/1996 | Ellis |
| 5,582,498 A | 12/1996 | Springer et al. |
| 5,664,930 A | 9/1997 | Ellis |
| 5,683,219 A | 11/1997 | Gilles et al. |
| 5,709,518 A | 1/1998 | Alexander et al. |
| 5,743,697 A | 4/1998 | Alexander |
| 5,762,459 A | 6/1998 | Springer et al. |
| 5,896,957 A | 4/1999 | Berends et al. |
| 5,927,928 A | 7/1999 | Hageman et al. |
| 5,934,857 A | 8/1999 | Alexander |
| 5,964,572 A | 10/1999 | Hahn et al. |
| 6,062,796 A | 5/2000 | Alexander |
| 6,082,952 A | 7/2000 | Alexander |
| 6,092,970 A | 7/2000 | Hahn et al. |
| 6,123,496 A | 9/2000 | Alexander |
| 6,139,242 A | 10/2000 | Alexander |
| 6,162,005 A | 12/2000 | Fritz |
| 6,190,109 B1 * | 2/2001 | Bender ............... B65G 69/003 414/401 |
| 6,238,163 B1 | 5/2001 | Springer et al. |
| 6,250,432 B1 | 6/2001 | Hageman et al. |
| 6,276,496 B1 | 8/2001 | Hageman et al. |
| 6,322,311 B1 | 11/2001 | Alexander |
| 6,336,527 B1 | 1/2002 | Metz |
| RE37,570 E | 3/2002 | Springer et al. |
| 6,357,987 B1 | 3/2002 | Palus |
| 6,368,043 B1 | 4/2002 | Leum et al. |
| 6,371,253 B1 | 4/2002 | Berends et al. |
| 6,390,245 B1 | 5/2002 | Metz |
| 6,478,525 B2 | 11/2002 | Hageman et al. |
| 6,488,464 B1 | 12/2002 | Kish |
| 6,505,713 B1 | 1/2003 | Paul et al. |
| 6,524,053 B2 | 2/2003 | Hahn et al. |
| 6,589,003 B2 | 7/2003 | Berends |
| 6,676,360 B2 | 1/2004 | Springer et al. |
| 6,690,287 B2 | 2/2004 | Jette et al. |
| 7,032,720 B2 | 4/2006 | Jette et al. |
| 7,056,077 B2 | 6/2006 | Pedersen et al. |
| 7,226,265 B2 | 6/2007 | Wilson |
| 7,264,092 B2 | 9/2007 | Jette |
| 7,864,030 B2 | 1/2011 | Jette |
| 8,286,757 B2 | 10/2012 | Nelson |
| 8,287,223 B2 * | 10/2012 | Andersen ............ B65G 69/003 414/401 |
| 8,307,956 B2 | 11/2012 | Andersen et al. |
| 8,499,897 B2 | 8/2013 | Brooks et al. |
| 8,528,929 B2 | 9/2013 | Kimener |
| 8,529,183 B2 | 9/2013 | Ion |
| 8,532,816 B2 | 9/2013 | Ion |
| 8,590,674 B2 | 11/2013 | Jette |
| 8,596,949 B2 | 12/2013 | Harrington |
| 8,616,826 B2 * | 12/2013 | Cotton ............... B65G 69/003 414/584 |
| 8,678,736 B2 * | 3/2014 | Andersen ............ B65G 69/003 414/401 |
| 8,905,198 B2 | 12/2014 | Brooks et al. |
| 9,126,775 B2 | 9/2015 | Brooks et al. |
| 9,139,384 B2 | 9/2015 | Brooks et al. |
| 9,145,273 B2 * | 9/2015 | Brooks ............... B65G 69/003 |
| 9,174,811 B2 * | 11/2015 | Proffitt ............... B65G 69/003 |
| 9,227,799 B2 * | 1/2016 | Brooks ............... B65G 69/003 |
| 9,272,854 B2 * | 3/2016 | Lessard ............... B65G 69/003 |
| 9,481,531 B2 * | 11/2016 | Stone ............... B65G 69/003 |
| 9,586,771 B2 * | 3/2017 | Brooks ............... B65G 69/003 |
| 9,694,790 B2 | 7/2017 | Kimener |
| 9,751,702 B1 | 9/2017 | Hoofard et al. |
| 10,689,213 B2 * | 6/2020 | Mushynski ........ B65G 69/003 |
| 10,906,759 B2 * | 2/2021 | Schlintz ............ B65G 69/003 |
| 10,988,329 B2 * | 4/2021 | Whitley ............ B65G 69/003 |
| 11,254,526 B1 * | 2/2022 | Meichtry ............... B60D 1/04 |
| 2002/0136620 A1 | 9/2002 | Berends |
| 2002/0141852 A1 | 10/2002 | Hahn et al. |
| 2003/0159892 A1 | 8/2003 | Jette |
| 2003/0170097 A1 | 9/2003 | Pedersen et al. |
| 2004/0005210 A1 * | 1/2004 | Alexander ........ B65G 69/003 414/584 |
| 2004/0042882 A1 * | 3/2004 | Breen ............... B65G 69/003 414/401 |
| 2005/0133315 A1 | 6/2005 | Hoofard |
| 2005/0226705 A1 | 10/2005 | Wilson et al. |
| 2006/0051196 A1 | 3/2006 | Mcdonald |
| 2006/0136782 A1 | 6/2006 | Corniot |
| 2006/0144649 A1 | 7/2006 | Jette |
| 2006/0182559 A1 | 8/2006 | Gleason et al. |
| 2007/0248440 A1 | 10/2007 | Andersen et al. |
| 2008/0124203 A1 | 5/2008 | Mcdonald |
| 2009/0026022 A1 | 1/2009 | Andersen et al. |
| 2009/0155030 A1 | 6/2009 | Andersen et al. |
| 2009/0194375 A1 | 8/2009 | Andersen et al. |
| 2009/0194376 A1 | 8/2009 | Brooks et al. |
| 2009/0223764 A1 | 9/2009 | Andersen et al. |
| 2010/0260585 A1 | 10/2010 | Sander et al. |
| 2010/0260586 A1 | 10/2010 | Hahn et al. |
| 2011/0158778 A1 | 6/2011 | Harrington et al. |
| 2011/0162916 A1 | 7/2011 | Saliger et al. |
| 2011/0176896 A1 | 7/2011 | Andersen et al. |
| 2011/0264270 A1 | 10/2011 | Ion |
| 2012/0006632 A1 | 1/2012 | Nelson et al. |
| 2012/0234087 A1 | 9/2012 | Strahan et al. |
| 2013/0292214 A1 | 11/2013 | Brooks et al. |
| 2014/0255134 A1 | 9/2014 | Brooks et al. |
| 2015/0191319 A1 | 7/2015 | Muhl et al. |
| 2015/0239686 A1 | 8/2015 | Stone et al. |
| 2016/0090072 A1 | 3/2016 | Eppley et al. |
| 2017/0066607 A1 * | 3/2017 | Muhl ............... B65G 69/003 |
| 2019/0367300 A1 * | 12/2019 | Mushynski ........ B65G 69/003 |
| 2020/0255234 A1 * | 8/2020 | Sveum ............... B65G 69/003 |

FOREIGN PATENT DOCUMENTS

| | | |
|---|---|---|
| DE | 4120035 A1 | 12/1992 |
| DE | 4427406 | 10/1995 |
| EP | 0452519 | 10/1991 |
| EP | 0609049 | 8/1994 |
| EP | 0684915 | 12/1995 |
| EP | 0775653 | 5/1997 |
| EP | 1112950 | 7/2001 |
| EP | 1764275 | 3/2007 |
| EP | 2170663 A1 | 4/2010 |
| EP | 2796395 A1 | 10/2014 |

(56) References Cited

FOREIGN PATENT DOCUMENTS

| | | |
|---|---|---|
| FR | 2736336 A1 | 1/1997 |
| WO | 9518029 A1 | 7/1995 |
| WO | 199935067 | 7/1999 |
| WO | 2004078618 A1 | 9/2004 |
| WO | 2009032372 A1 | 3/2009 |
| WO | 2009100146 A1 | 8/2009 |
| WO | 2009111244 A1 | 9/2009 |
| WO | 20090139946 | 11/2009 |
| WO | 2010090884 A1 | 8/2010 |
| WO | 2010118032 A1 | 10/2010 |
| WO | 2014137874 A1 | 9/2014 |
| WO | 2015077893 A1 | 6/2015 |

OTHER PUBLICATIONS

Vehicle Restraints, Safety Chock Series SLSC 2000, User's Manual, Sep. 1999, SERCO, 32 pages.

\* cited by examiner

VEHICLE RESTRAINT SYSTEMS AND METHODS

TECHNICAL FIELD

The present disclosure is generally related to vehicle restraints and, more particularly, to vehicle restraints for restraining transport trailers, trucks, and/or other vehicles at loading docks.

BACKGROUND

Vehicle restraints are well known in the material handling industry and are typically used to prevent a trailer or other transport vehicle from moving away from a loading dock during the loading and/or unloading process. Absent a restraint, the vehicle may tend to move away from the loading dock for a number of reasons, such as the slope of the driveway, the kinetic energy imparted to the vehicle by a fork truck or personnel during the loading or unloading process, etc. If the vehicle is allowed to move away from the dock face, a gap may form between the vehicle and the dock face or between the vehicle and the lip of an associated dock leveler. If this occurs, a fork truck operator could inadvertently drive into the gap, or other personnel could inadvertently step into the gap, potentially damaging equipment or injuring personnel.

Unlike wheel chocks, conventional vehicle restraints typically engage the Rear Impact Guard ("RIG") bar of the vehicle. As is well known, RIG bars (which can also be referred to as "ICC" bars) are horizontal members that extend across the rear of the vehicle below the bed. In the U.S., regulations require that the vertical distance between the bottom edge of the RIG bar and the ground not exceed 22 inches at any point across the full width of the member, and that the rearmost surface of the RIG bar be within 12 inches of the rear extremity of the vehicle.

There are several different types of vehicle restraints. One type employs a restraining member (e.g., a hook) operably coupled to a vertically-moving carriage having rollers that ride on a track mounted to the face of the loading dock. Examples of such restraints are disclosed in U.S. Pat. Nos. 4,472,099, 4,443,150, 4,282,621, 4,264,259, 4,695,216 and 6,162,005, each of which is incorporated herein by reference in its entirety. To operate the restraint, the vehicle backs into the loading dock until the RIG bar contacts an angled lead-in surface of the restraint carriage, causing the carriage to move downwardly on the track as the RIG bar continues moving back. Eventually the RIG bar moves onto a horizontal surface of the restraint carriage that extends aft from the angled surface, enabling the locking hook to rotate upwardly to engage the RIG bar and secure the vehicle adjacent the loading dock.

DETAILED DESCRIPTION

Figure 1:
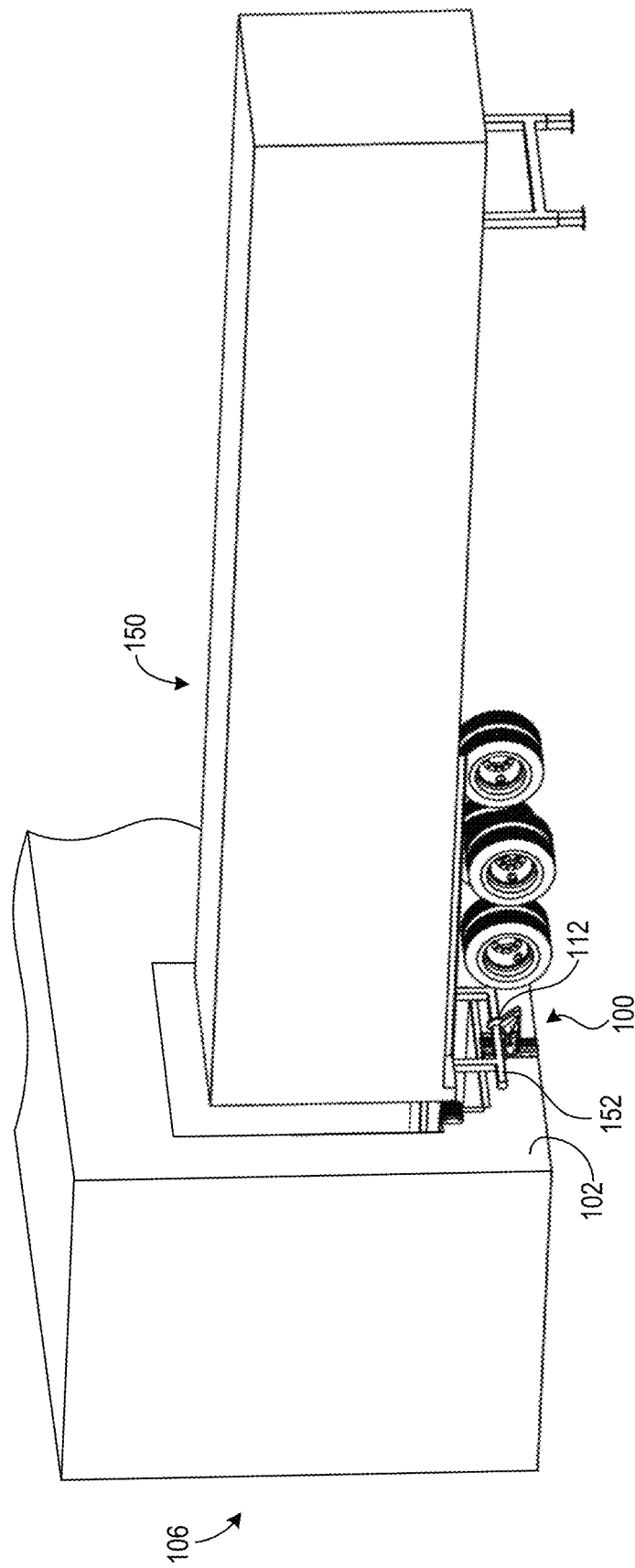
FIG. 1 is an isometric view of a truck trailer secured to a loading dock via a vehicle restraint having a restraint hook configured in accordance with embodiments of the present technology.

The following disclosure describes various embodiments of vehicle restraints for use at loading docks. The vehicle restraints described herein can include a vehicle engagement member, such as a restraint hook, for releasably engaging a RIG bar on a vehicle parked adjacent the loading dock. In some embodiments, the restraint hook is configured to engage RIG bars having a variety of geometries, including conventional RIG bars having a square cross-sectional area and modified RIG bars having more complex geometries, such as pentagonal shapes. For example, in some embodiments the restraint hook includes a scallop or other recessed feature along its shank that prevents the restraint hook from prematurely contacting the RIG bar as the restraint hook is being moved into a raised position for engagement with the RIG bar. Premature contact with the RIG bar is undesirable because it may prevent the restraint hook from reaching a sufficiently raised position from which it can successfully engage the RIG bar. Additionally, such premature contact could force the restraint hook downward as the vehicle moves away from the loading dock, thereby preventing the restraint hook from properly engaging the RIG bar. Thus, embodiments of the present technology enable the restraint hook to form a more reliable and secure engagement with a variety of RIG bar configurations.

Certain details are set forth in the following description and in FIGS. 1-7C to provide a thorough understanding of various embodiments of the present technology. In other instances, well-known structures, materials, operations and/or systems often associated with loading docks, vehicle restraints, related hardware and manufacturing methods, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of some embodiments of the disclosure. Accordingly, other embodiments can have other details, dimensions, angles, and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view of a truck trailer 150 secured to a loading dock 106 via a vehicle restraint 100. The trailer 150 can be any conventional trailer known in the art, such as a semi-truck trailer for hauling cargo. The trailer 150 may have a height that is generally similar to the height of the loading dock 106 to facilitate loading and/or unloading of the trailer 150. The trailer 150 includes a RIG bar 152 that extends horizontally across the rear of the trailer 150, below the bed of the trailer 150. The vehicle restraint 100 is fixedly mounted to a face 102 of the loading dock 106. As those of ordinary skill in the art will understand, the vehicle restraint 100 is typically positioned on the centerline, or at least close to the centerline, of the loading dock 106 at a suitable height for engaging a RIG bar of a trailer (e.g., the RIG bar 152 of the trailer 150) or other shipping vehicle. Additionally, those of ordinary skill in the art will understand that in some embodiments the loading dock 106 can include a dock leveler (not shown) having a lip configured to extend into the trailer, and in these embodiments the lip of the dock leveler may be stored directly above the vehicle restraint 100. As described in greater detail below, the vehicle restraint 100 can engage the RIG bar 152 to secure the trailer 150 to the loading dock 106 to prevent the trailer 150 from moving away from the loading dock 106 as the trailer 150 is unloaded or loaded. For example, in the illustrated embodiment, the vehicle restraint 100 includes a restraint hook 112 that is engaged with the RIG bar 152, thereby preventing and/or reducing movement of the trailer 150 away from the loading dock 106. As described in greater detail below with reference to FIGS. 5A-7C, the restraint hook 112 has an improved geometry relative to conventional restraint hooks that enables the restraint hook 112 to form a more reliable and secure engagement with a variety of RIG bar configurations.

Figure 2:
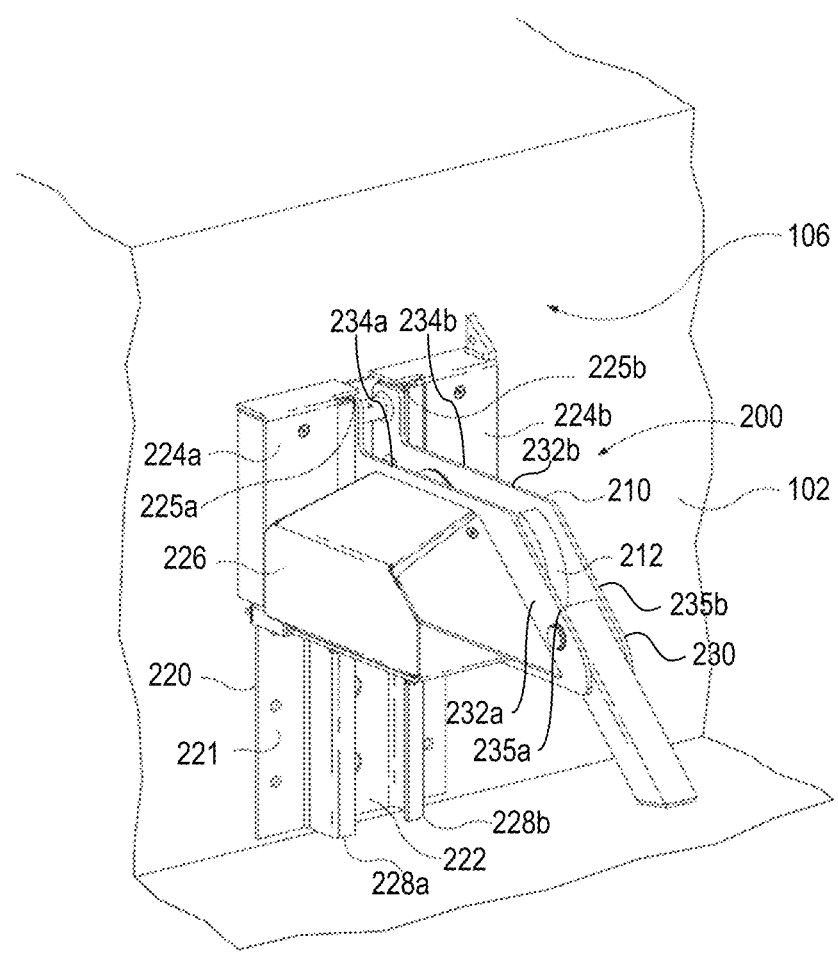
FIG. 2 is an isometric view of a vehicle restraint having a conventional restraint hook.

FIG. 2 is an isometric view of a vehicle restraint 200 secured to the loading dock 106. The vehicle restraint 200 includes a conventional restraint hook 212, and a carriage assembly 210 movably coupled to a track assembly 220. In some embodiments, the track assembly 220 includes a mounting plate 221 which can be fixedly attached to the dock face 102 by a plurality of bolts or other suitable fasteners in a conventional manner. Additionally, the track assembly 220 can further include a guide track 222 having a first vertical channel 228a spaced apart from and facing a second vertical channel 228b that enables the carriage assembly 210 to move up and/or down during engagement with a vehicle RIG bar. In some embodiments, the carriage assembly 210 can be resiliently biased toward an upper position on the track assembly 220 (as shown in FIG. 2) by one or more biasing members (e.g., coil tension springs; not shown) which can be enclosed in a first housing 224a and a second housing 224b. The track assembly 220 can enable the carriage assembly 210 to move resiliently downward as needed in response to contact from a vehicle RIG bar during RIG bar engagement, and to move upward and downward as needed after RIG bar engagement and in response to vehicle loading and/or unloading.

The carriage assembly 210 includes a frame 230 having a first side plate 232a spaced apart from a second side plate 232b. Each of the first and second side plates 232a, 232b includes an angled edge surface 235a, b, respectively, for initial contact with a RIG bar of a vehicle, and an adjacent horizontal edge surface 234a, b, respectively, for subsequent contact with the RIG bar. The restraint hook 212 is pivotally coupled or pinned to the frame 230 in the space between the first and second side plates 232a, 232b (e.g., by means of a rotatable shaft, not shown). As described in greater detail below, the restraint hook 212 is configured to rotate upwardly and engage the RIG bar of a vehicle to restrain the vehicle at the loading dock 106. In some embodiments, a motor (e.g., an electric motor enclosed in housing 226) or other suitable actuation mechanism can be operably coupled to the restraint hook 212. In operation, the motor or other actuation mechanism can be activated (by, e.g., a dock operator at a control panel) to raise the restraint hook 212 to a first position for engaging a RIG bar, and/or to lower the restraint hook 212 to a second position (e.g., as shown in FIG. 2) for storing the restraint hook 212. The vehicle restraint 200 may have additional features not expressly described herein, such as those described in U.S. application Ser. No. 16/277,444, filed Feb. 15, 2019, and U.S. application Ser. No. 15/466,006, filed Mar. 22, 2017, the disclosures of which are incorporated by reference herein in their entireties.

Figure 3A:
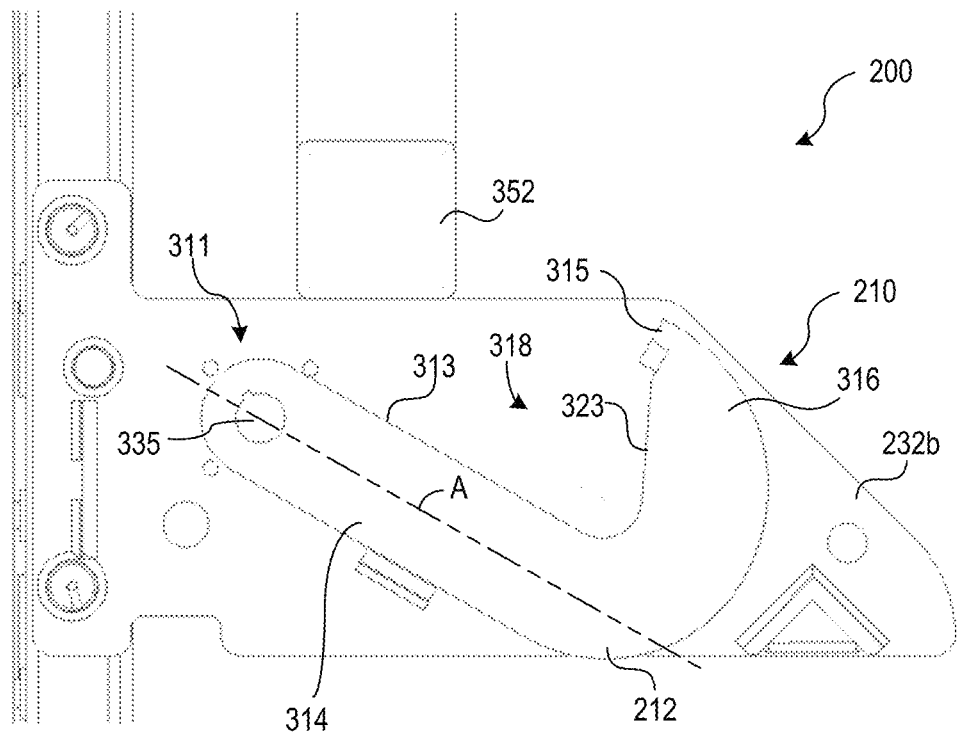
FIGS. 3A-3C are a series of side views showing various stages of operation of the conventional restraint hook of FIG. 2 engaging a conventional RIG bar.
Figure 3B:
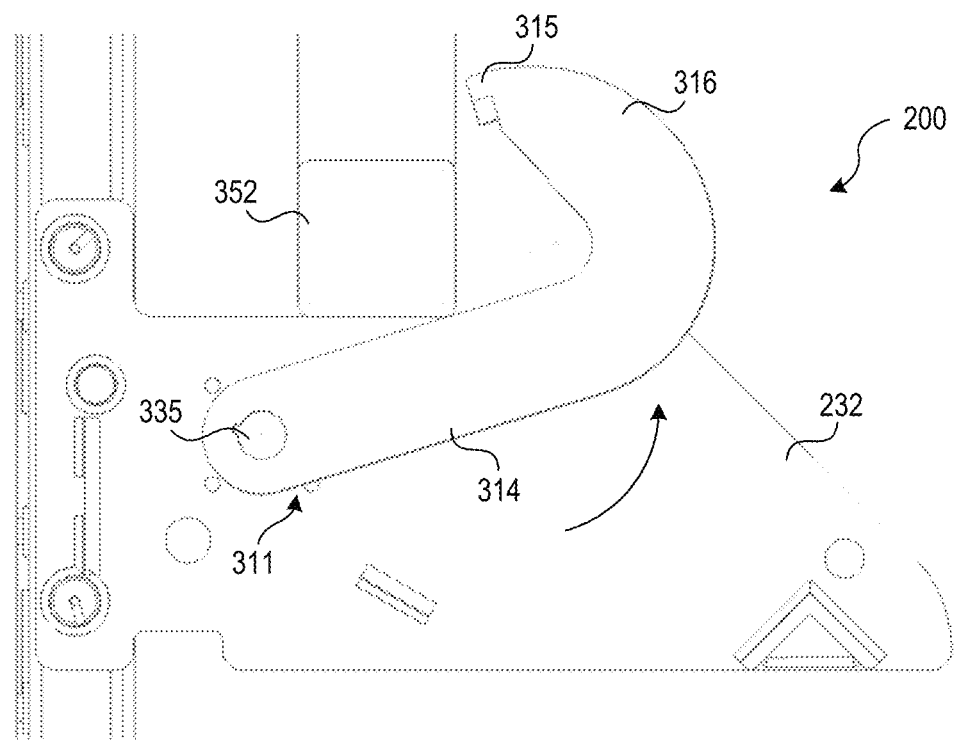
Figure 3C:
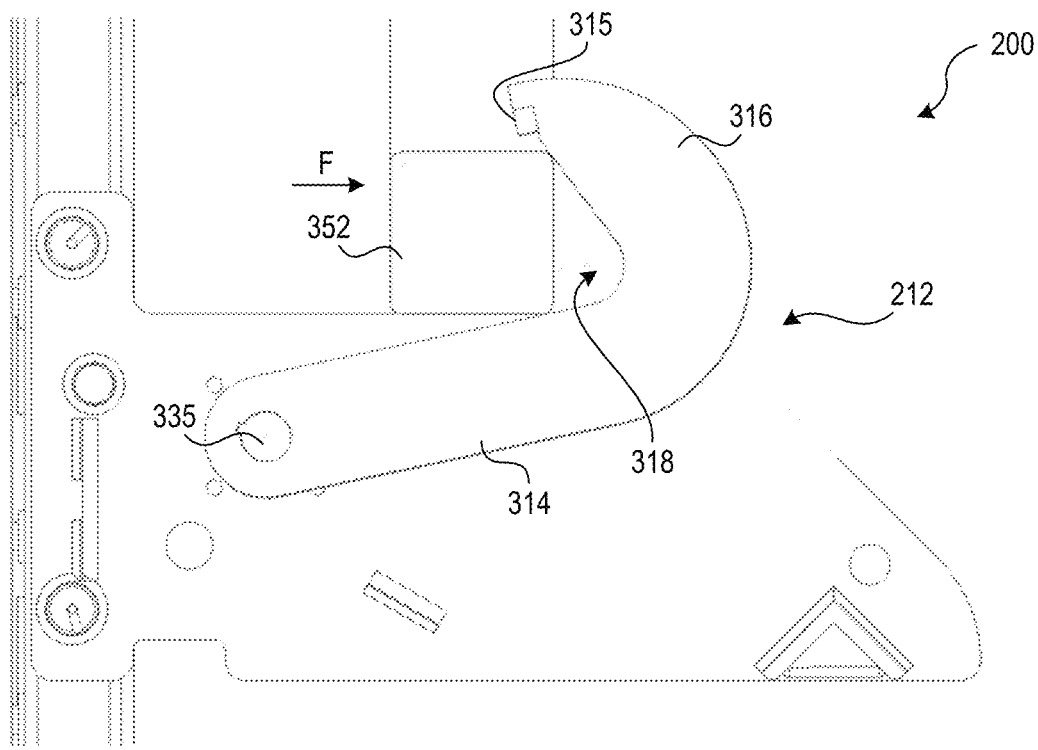

FIGS. 3A-3C are a series of side views illustrating operation of the conventional restraint hook 212. Selected portions of the vehicle restraint 200 (e.g., the housing 226 and the first side plate 232a) have been omitted to more clearly illustrate the principles of operation. Referring to FIGS. 3A-3C collectively, a first (e.g., proximal) end region 311 of the restraint hook 212 can be pivotably or rotatably coupled to the first side plate 232a (not shown in FIGS. 3A-3C) and the second side plate 232b. For example, the restraint hook 212 can be coupled to the first and second side plates 232a, 232b by a rotatable shaft 335. The restraint hook 212 is a conventional L- or J-shaped hook, having a bend portion 316 (or protrusion 316) that extends generally upwardly from a shank portion 314 (or body 314). The shank portion 314 includes an upper surface 313 that extends generally linearly and parallel to a longitudinal axis A of the restraint hook 212. Together, the upper surface 313 of the shank portion 314 and the inner surface 323 of the bend portion 316 define an engagement region 318 configured to contact/receive a vehicle RIG bar 352. The restraint hook 212 can also include a lip 315 protruding inwardly from a tip of the bend portion 316.

Referring now to FIG. 3A, the restraint hook 212 is shown in a first (e.g., lowered or stored) position in which it is recessed between the first and second side plates 232a, 232b. In operation, a motor or other actuation mechanism can rotate the rotatable shaft 335 in a first (e.g., counterclockwise) direction to rotate the restraint hook 212 upwardly from the stored position shown in FIG. 3A to a second (e.g., raised) position for RIG bar engagement, as shown in FIG. 3B. The motor or other actuation mechanism can also selectively rotate the rotatable shaft 335 in a second (e.g., clockwise) direction opposite the first direction to rotate the restraint hook 212 downwardly from the raised position shown in FIG. 3B to return the restraint hook 212 to the stored position shown in FIG. 3A. As shown in FIG. 3C, once the restraint hook 212 is in the raised position, forward motion of the RIG bar 352 in a direction F away from the loading dock causes the restraint hook 212 to catch and engage the RIG bar 352. This prevents further forward motion of the RIG bar 352 and the trailer or other vehicle to which the RIG bar 352 is attached.

The RIG bar 352 shown in FIGS. 3A-3C is a conventional RIG bar having a generally square cross-sectional area (e.g., 4 inches by 4 inches). However, in response to revised industry regulations, the shape of RIG bars is being modified to include more complex geometries. For example, the modified RIG bars may have an increased depth (e.g., in the horizontal direction) relative to conventional RIG bars, and/or may have more complex cross-sectional shapes (e.g., pentagonal). Additional details regarding modified RIG bars are described in U.S. Pat. No. 10,525,920, the disclosure of which is incorporated herein by reference in its entirety.

Figure 4A:
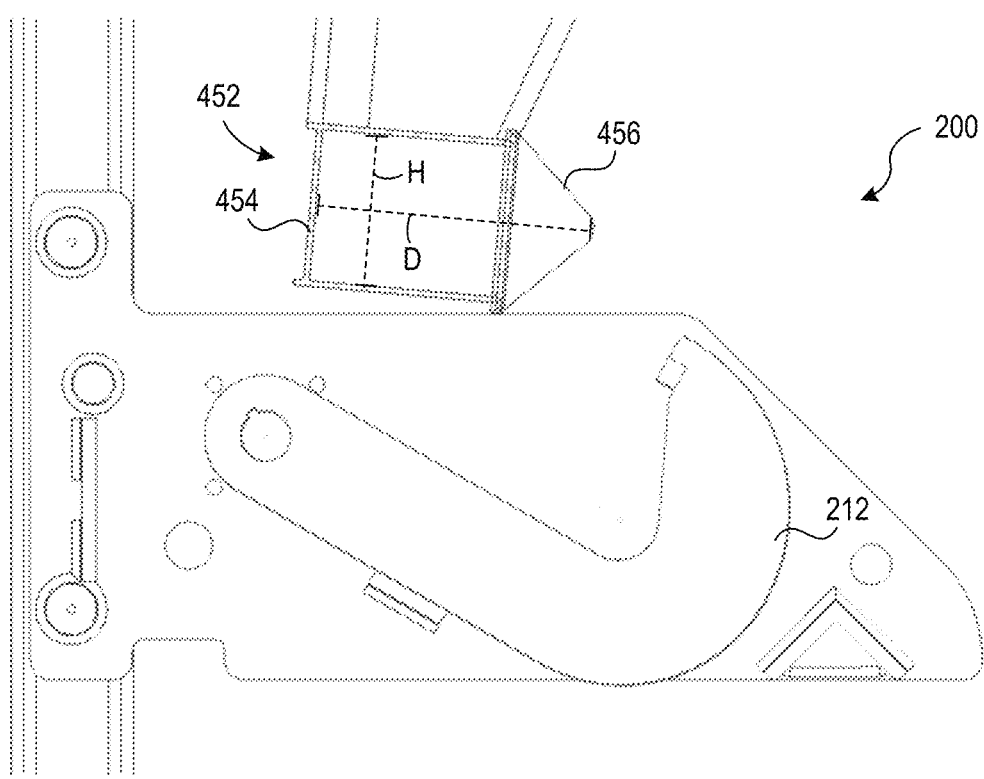
FIGS. 4A-4C are a series of side views showing various stages of operation of the conventional restraint hook of FIG. 2 attempting to engage a modified RIG bar.
Figure 4B:
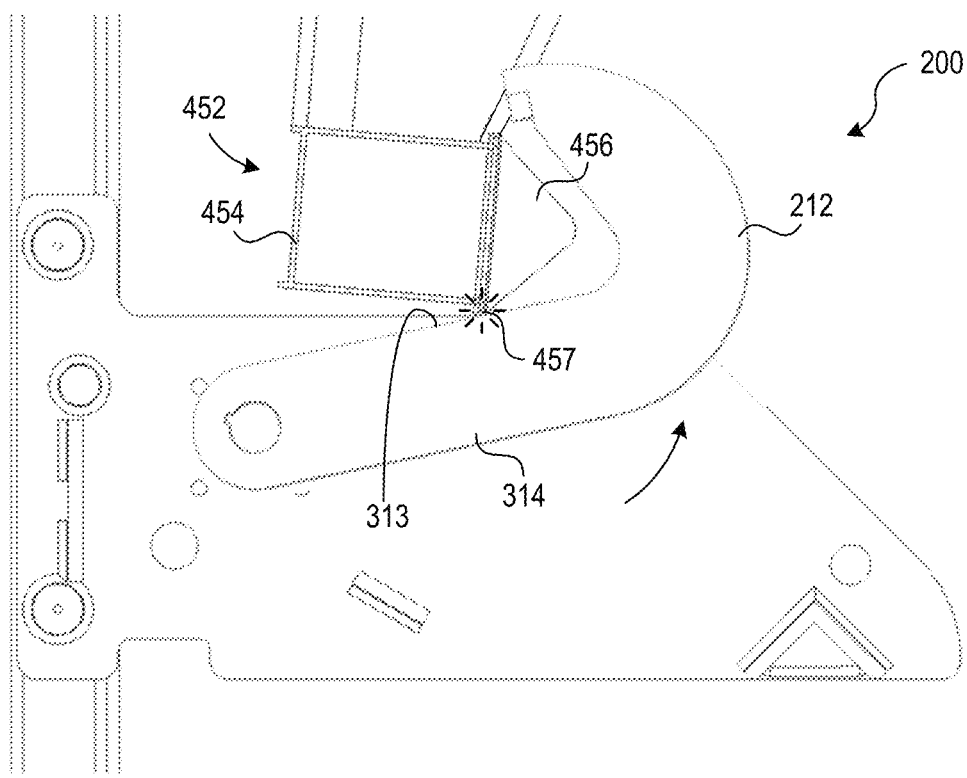
Figure 4C:
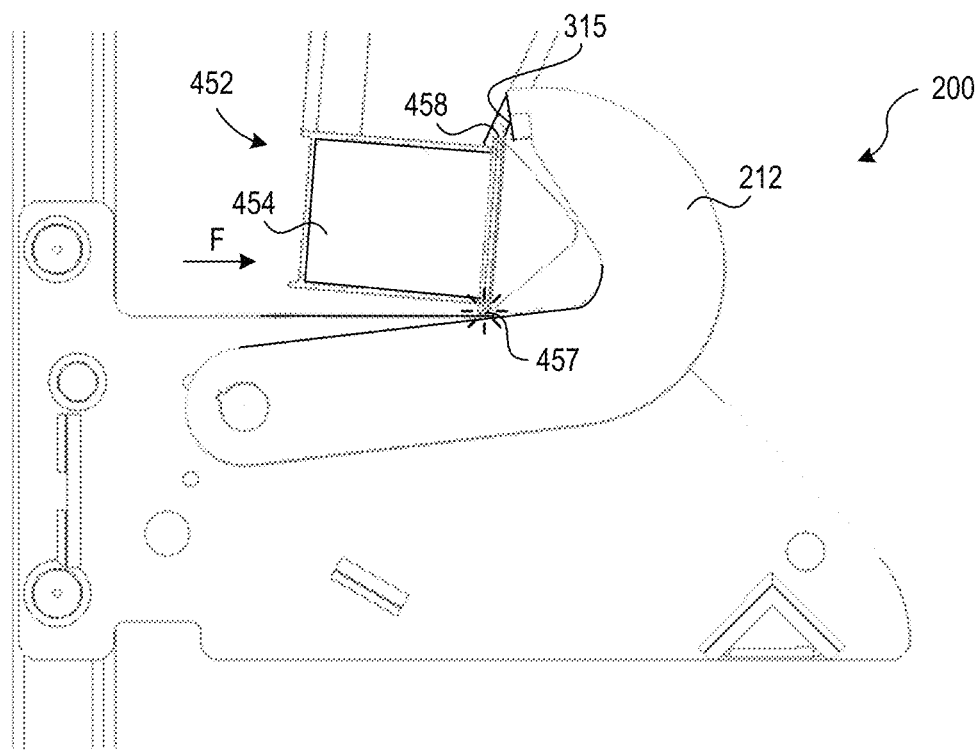

In some circumstances, the conventional restraint hook 212 may encounter problems engaging modified RIG bars. FIGS. 4A-4C, for example, are a series of side views depicting the conventional restraint hook 212 attempting to engage a modified RIG bar 452. Referring first to FIG. 4A, the modified RIG bar 452 has a depth D that is greater than its height H. For example, the depth D may be about 7 inches, while the height H may be about 4 inches, although other dimensions are possible. The modified RIG bar 452 also has a generally pentagonal cross-sectional shape. In particular, the modified RIG bar 452 includes a generally rectangular rear portion 454 and a generally triangular cap portion 456. Together, the rectangular rear portion 454 and the triangular cap portion 456 form the generally pentagonal shape. Because of the increased depth D of the modified RIG bar 452 relative to the conventional RIG bar 352, a front lower edge 457 of the modified RIG bar 452 can prematurely contact the upper surface 313 of the restraint hook 212 as the restraint hook 212 is rotated upwardly from the stored position toward the raised position, as shown in FIG. 4B. As a result, as the modified RIG bar 452 moves forward in direction F as shown in FIG. 4C, the front lower edge 457 of the modified RIG bar 452 pushes the restraint hook 212 downwardly and prevents the restraint hook 212 from securely engaging the modified RIG bar 452. For example, by pushing the restraint hook 212 downwardly, the lip 315 of the restraint hook 212 may fail to extend over a front upper edge 458 of the modified RIG bar 452, thus failing to "catch" the RIG bar 452 as it moves forward. Further forward motion of the RIG bar 452 in direction F may push the restraint hook 212 even further downwardly and completely out of engagement with the RIG bar 452.

Figure 5A:
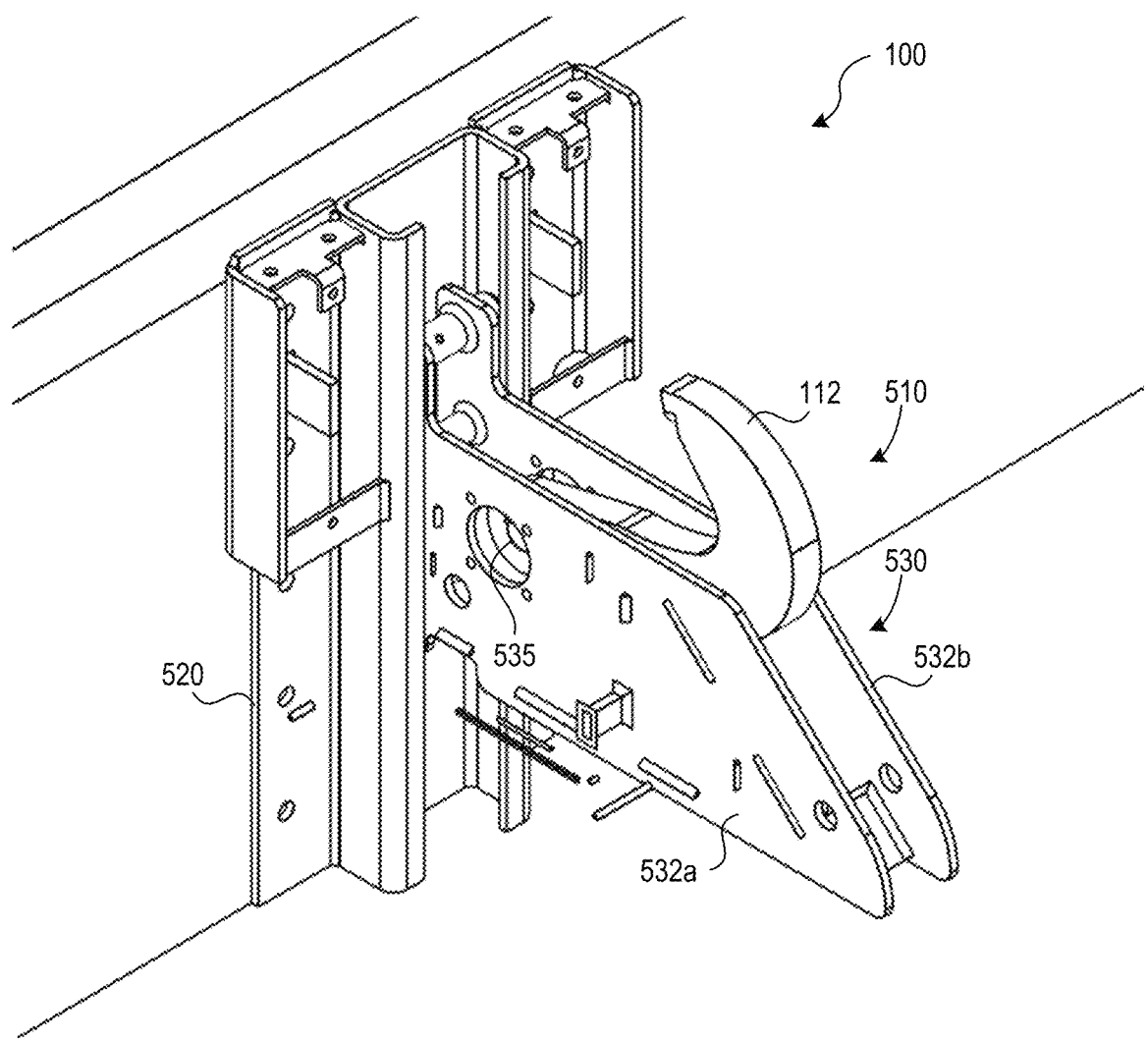
FIG. 5A is an isometric view of the vehicle restraint of FIG. 1 with a motor housing removed for purposes of illustration.

As described in detail below, embodiments of the present technology provide vehicle restraint hooks that can engage and restrain both conventional and modified RIG bars. For example, FIG. 5A is an isometric view of the vehicle restraint 100 shown in FIG. 1. The restraint hook 112 of the vehicle restraint 100 is configured to engage and restrain both conventional RIG bars (e.g., the RIG bar 352) and modified RIG bars (e.g., the RIG bar 452) made in accordance with the revised industry regulations. As described in greater detail below with respect to FIG. 5B, the restraint hook 112 has an improved geometry relative to the conventional restraint hook 212 that enables it to reliably engage both conventional RIG bars and modified RIG bars. Other aspects of the vehicle restraint 100 can be at least generally similar in structure and function to the vehicle restraint 200 described above with reference to FIG. 2. For example, the vehicle restraint 100 can include a carriage assembly 510 movably coupled to a track assembly 520, which can be generally similar to the track assembly 220. The carriage assembly 510 can include a frame 530 having a first side plate 532a spaced apart from a second side plate 532b. The restraint hook 112 can be recessed between the first and second side plates 532a, 532b, as previously described with respect to vehicle restraint 200. The vehicle restraint 100 can also operate in a similar manner as described above with respect to the vehicle restraint 200. For example, a motor or other actuation mechanism (not shown) can selectively actuate a rotatable shaft 535 to rotate the restraint hook 112 upwardly (e.g., to engage a RIG bar) and/or downwardly (e.g., to disengage a RIG bar). Although the discussion above addresses one type of vehicle restraint system, the restraint hooks of the present technology are not limited to use with any particular configuration of vehicle restraint unless specifically noted otherwise herein. Accordingly, the restraint hooks of the present technology can be used with a wide variety of vehicle restraints consistent with the present disclosure.

Figure 5B:
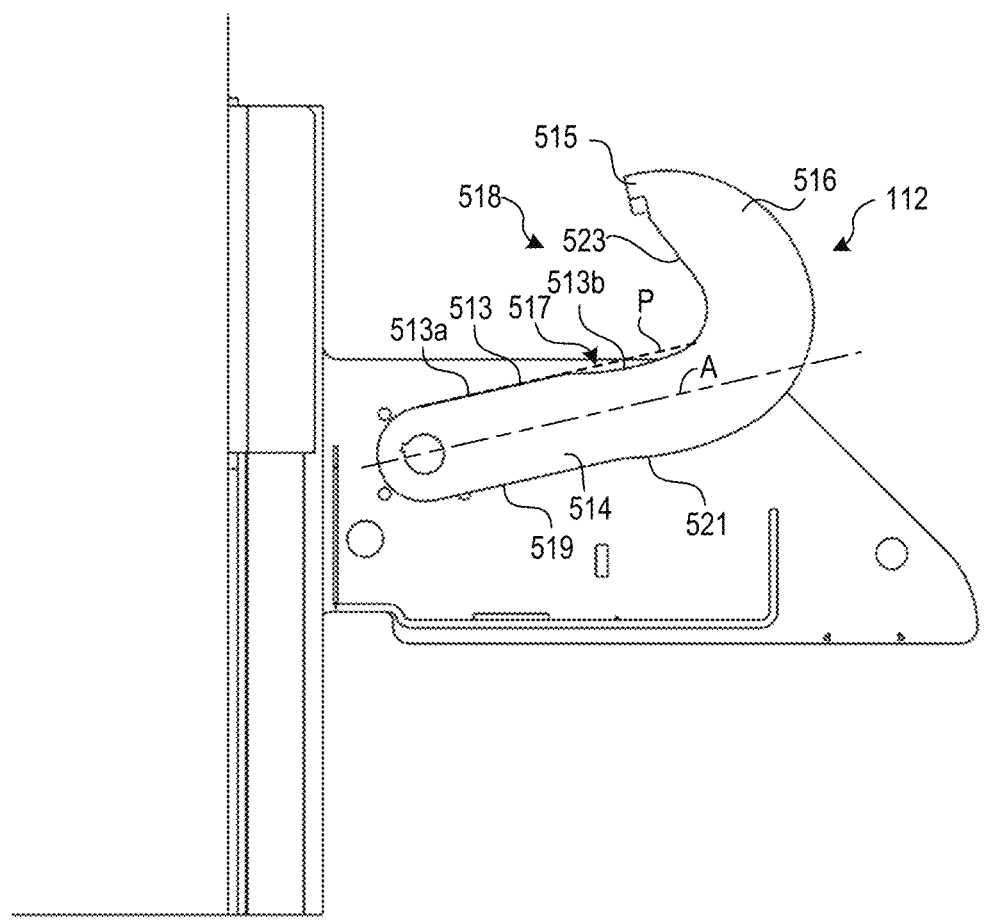
FIG. 5B is a side view of the vehicle restraint with a side plate removed for purposes of illustration.

FIG. 5B is a side view of the restraint hook 112 in a raised position. Selected portions of the vehicle restraint 100 have been omitted to more clearly illustrate the restraint hook 112. As illustrated, the restraint hook 112 includes a bend portion 516 that extends generally upwardly from a distal end of a shank portion 514, and an engagement region 518 formed by an upper surface 513 of the shank portion 514 and an inner surface 523 of the bend portion 516. A first (proximal) portion 513a of the upper surface 513 extends generally linearly and parallel to a central longitudinal axis A of the restraint hook 112. However, unlike the restraint hook 212, a second portion 513b of the upper surface 513 (between the first portion 513a and the inner surface 523 of the bend portion 516) curves inwardly toward the longitudinal axis A (e.g., inwardly relative to a plane P extending from the first portion 513a) to form a scallop feature 517 (e.g., a divot, recess, cut-out, etc.) in the shank portion 514. Although shown as a slightly curved recess, the scallop feature 517 can have a variety of geometries that define a cut-out or other recessed feature in the upper surface 513 of the restraint hook 112. For example, the scallop feature 517 can include a non-curved recess, such as a polygonal, triangular, or rectangular cut-out. Likewise, although the upper surface 513 is illustrated as curving inwardly toward the longitudinal axis A of the restraint hook 112, the upper surface 513 may have other topographies that define the scallop feature 517. For example, the upper surface 513 can have varying degrees of curvature and/or can included a non-curved but inwardly angled surface relative to the plane P.

In some embodiments, a lower surface 519 of the shank portion 514 may have a topography that generally matches the topography of the upper surface 513. For example, in the illustrated embodiment the lower surface 519 includes protruding portion 521 (e.g., a curvature 521) that extends/bends away from the central longitudinal axis A of the shank portion 514. The degree of the protruding portion 521 or curvature 521 can be the same or about the same as the shape and/or degree of curvature forming the scallop feature 517 such that the cross-sectional dimensions (e.g., width, height, etc.) remain generally constant along an axial length of the shank portion 514 (e.g., thereby preserving structural integrity of the restraint hook 112). In other embodiments, the lower surface 519 does not include the curvature 521, and the cross-sectional area of the shank portion 514 decreases in the portion having the scallop feature 517. The restraint hook 112 can also include a lip 515 protruding inwardly from a tip of the bend portion 516.

Figure 6A:
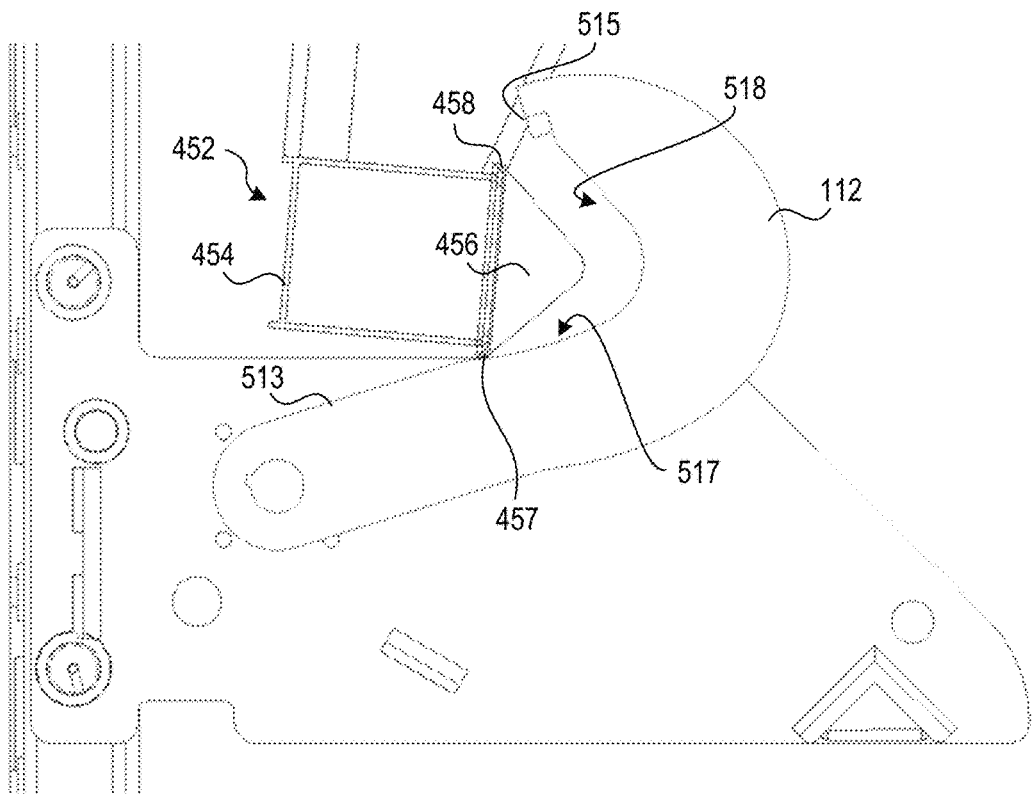
FIGS. 6A-6C are a series of side views showing various stages of operation of the restraint hook of FIGS. 5A and 5B engaging a modified RIG bar in accordance with embodiments of the present technology.
Figure 6B:
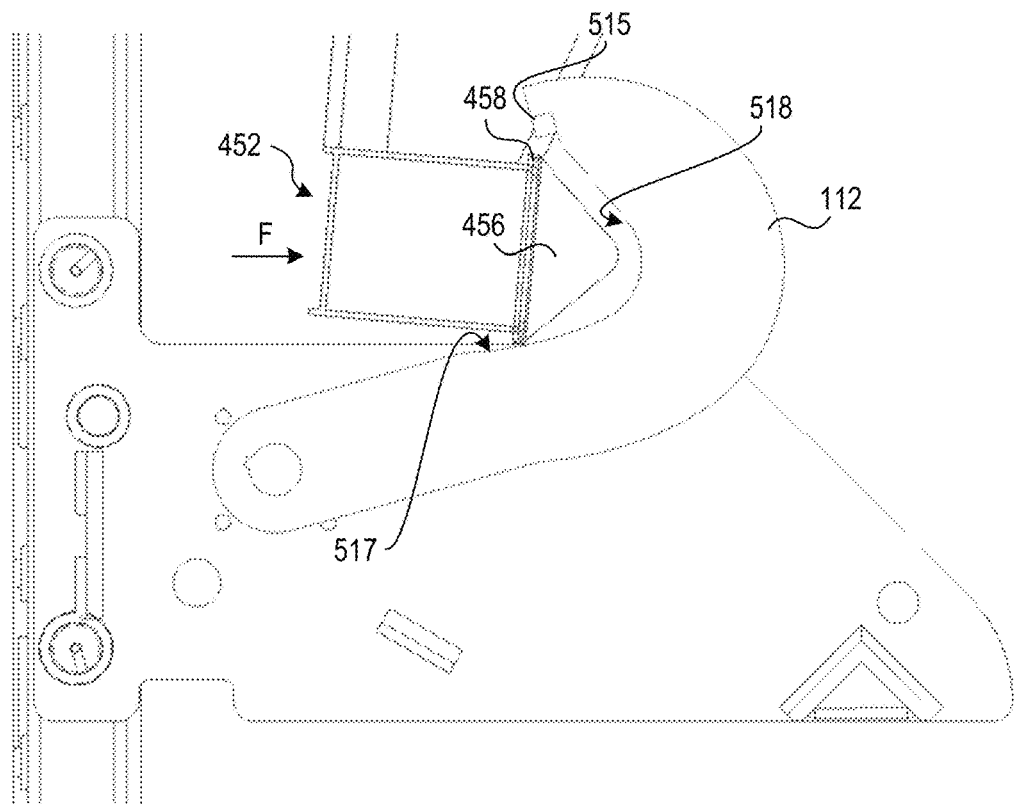
Figure 6C:
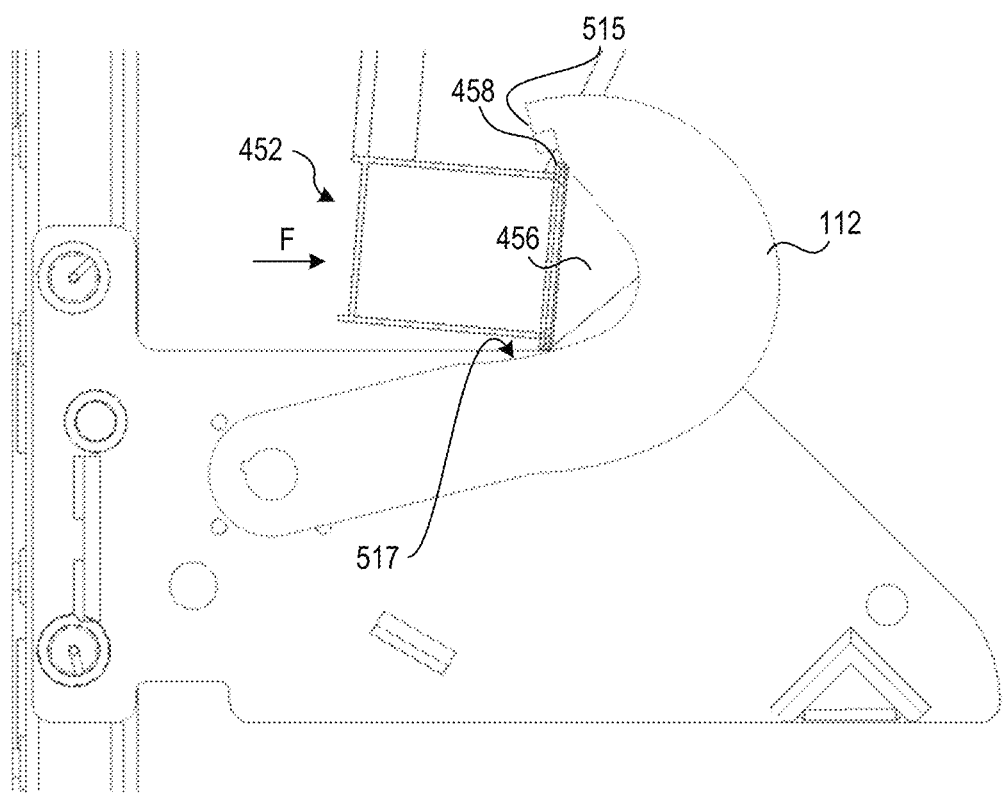

In one aspect of this embodiment, the scallop feature 517 prevents the restraint hook 112 from prematurely contacting an undersurface of the RIG bar before the restraint hook 112 is in position to engage the RIG bar, enabling the restraint hook 112 to engage and secure modified RIG bars. For example, FIGS. 6A-6C are a series of side views showing operation of the restraint hook 112 engaging the modified RIG bar 452. Referring to FIGS. 6A-6C together, the scallop feature 517 enables the restraint hook 112 to be rotated upwardly into a sufficiently raised position for engagement with the RIG bar 452. In particular, the scallop feature 517 prevents the upper surface 513 of the restraint hook 112 from prematurely contacting the RIG bar 452 as it is rotated upwardly. As a result, as the RIG bar 452 moves away from the loading dock in a direction F as shown in FIG. 6B, the front lower edge 457 of the modified RIG bar 452 moves further into the scallop feature 517 instead of forcing the restraint hook 112 downwardly and away from the raised position. As a result, the lip 515 on the restraint hook 122 moves over the front upper edge 458 of the restraint hook 112 as shown in FIG. 6C. The restraint hook 112 therefore catches the RIG bar 452 in the engagement region 518 and secures the trailer (not shown) at the loading dock. This is in contrast to the operation of the conventional restraint hook 212 described above, in which the restraint hook 212 prematurely contacts the front lower edge 457 of the modified RIG bar 452. As previously described, this premature contact may prevent the restraint hook 212 from reaching a sufficiently raised position from which it can successfully engage the RIG bar 452.

Figure 7A:
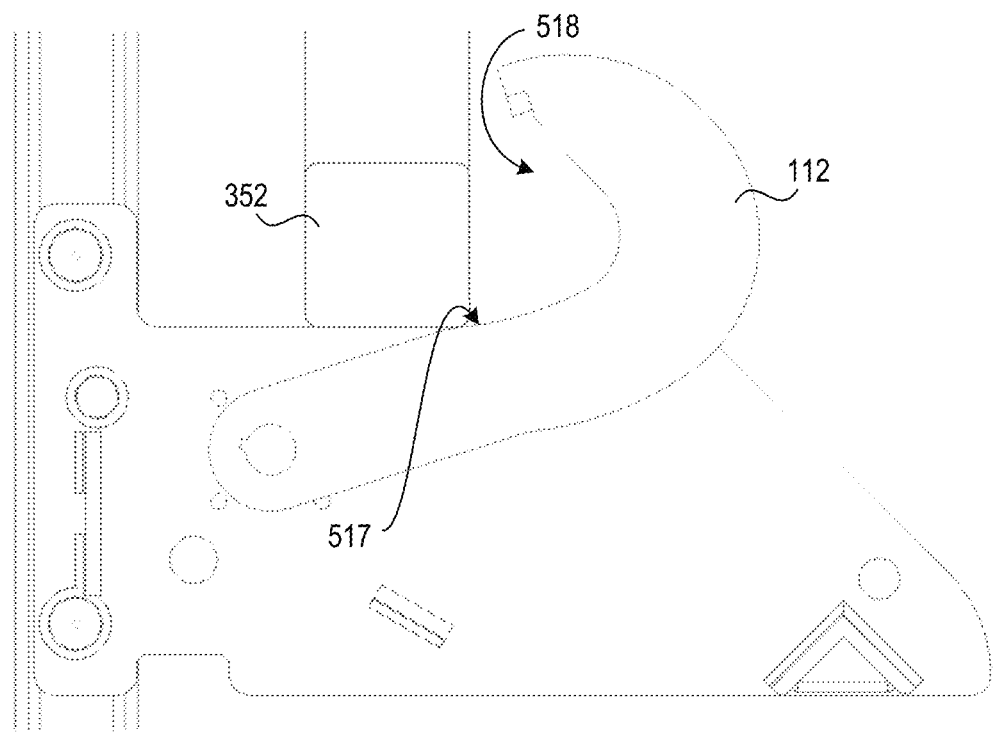
FIGS. 7A-7C are a series of side views showing various stages of operation of the restraint hook of FIGS. 5A and 5B engaging a conventional RIG in accordance with embodiments of the present technology.
Figure 7B:
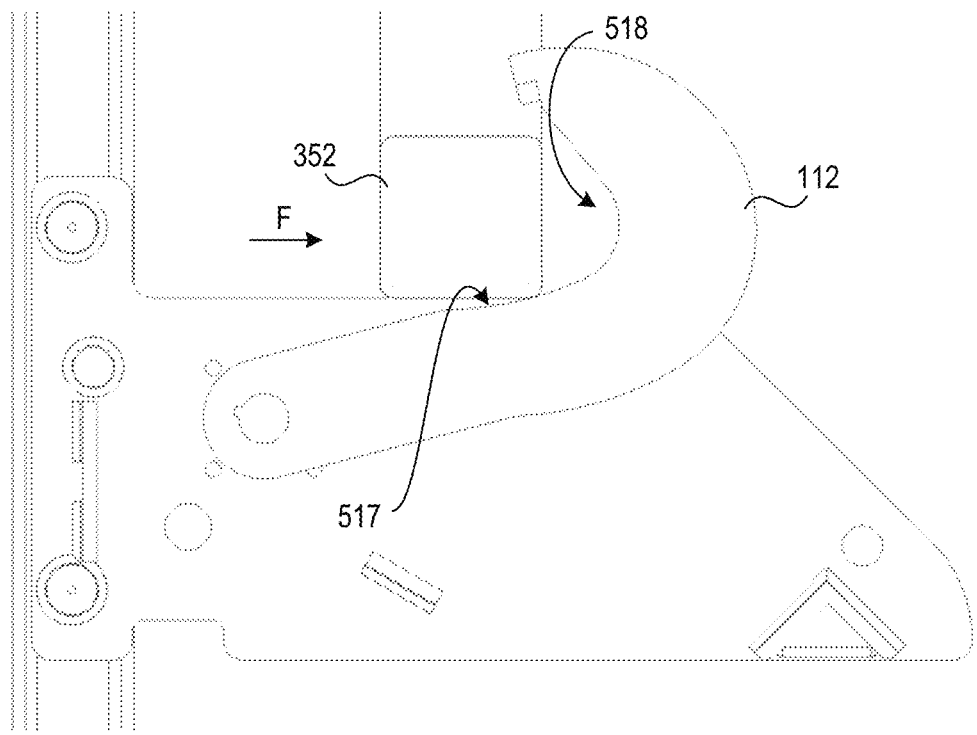
Figure 7C:
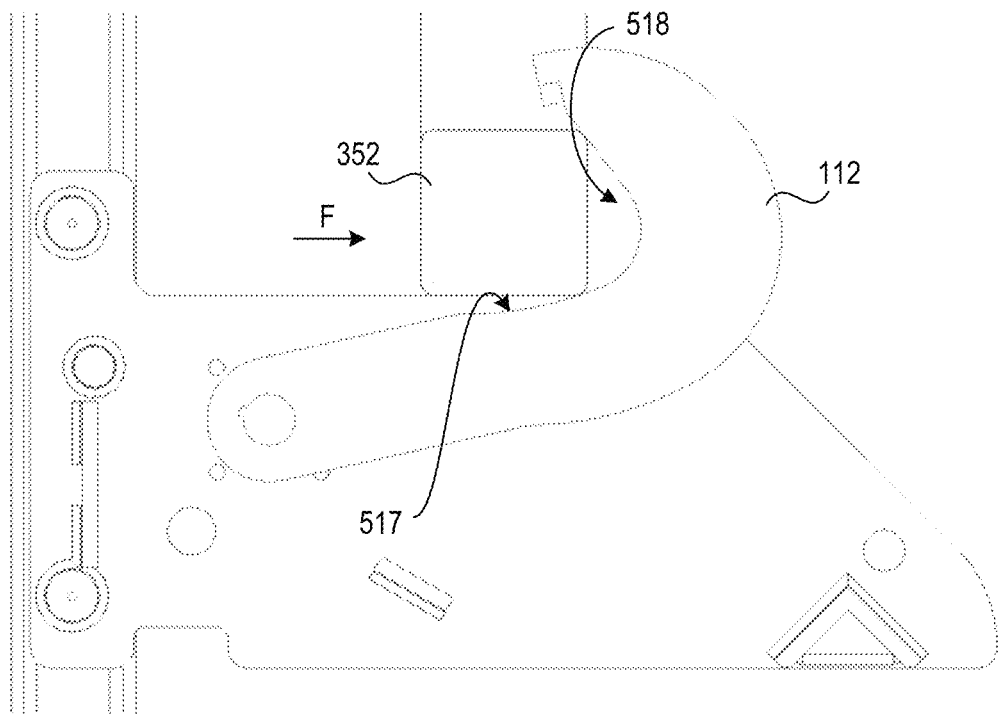

The restraint hook 112 can also be used to engage and secure conventional RIG bars, such as the RIG bar 352. FIGS. 7A-7C are a series of side views showing operation of the restraint hook 112 engaging the conventional RIG bar 352. Similar to the operation described with respect to FIGS. 6A-6C, the RIG bar 352 moves into the engagement region 518 of the restraint hook 112 as the RIG bar 352 moves away from the unloading dock in direction F. As shown in FIGS. 7B and 7C, the restraint hook 112 catches the RIG bar 352 and secures the trailer (not shown) at the loading dock. The present technology therefore provides improved vehicle restraints that are able to engage and secure a variety of different RIG bar geometries. This is especially useful since shifting industry regulations are prompting redesign of RIG bars into a form that can, in at least some circumstances, prevent them from being secured with conventional vehicle restraints.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A vehicle restraint system, comprising:
   a carriage assembly movably coupled to a face of a loading dock, the carriage assembly including—
      a frame; and
      a restraint hook having a shank portion and a bend portion extending upwardly from a distal end of the shank portion, the shank portion and the bend portion together defining an engagement region,
   wherein the restraint hook is pivotally coupled to the frame at a proximal end of the shank portion and pivotable about a pivot axis between a lowered position and a raised position, wherein in the raised position, the engagement region is positioned to engage a rear impact guard bar of a vehicle positioned at the loading dock, wherein the shank portion has a longitudinal axis extending from the pivot axis toward the distal end, wherein the shank portion further has an upper surface extending between the proximal end and the distal end, wherein the upper surface includes a first surface portion extending parallel to the longitudinal axis and a second surface portion that defines a scallop feature positioned within the engagement region, and wherein the upper surface inclusive of the scallop feature is positioned to one side of the longitudinal axis.

2. The vehicle restraint system of claim 1, wherein the scallop feature is a recess in the upper surface having a curved shape, a polygonal shape, a triangular shape, or a rectangular shape.

3. The vehicle restraint system of claim 1, wherein the engagement region is at least partially defined by the scallop feature and a portion of an inner surface of the bend portion.

4. The vehicle restraint system of claim 1, wherein the frame further comprises a first side plate and a second side plate spaced apart from the first side plate, wherein the first side plate and the second side plate each comprise a horizontal contact surface configured to contact the rear impact guard bar of the vehicle.

5. The vehicle restraint system of claim 4, wherein the restraint hook is positioned between the first side plate and the second side plate and recessed below the horizontal contact surfaces when the restraint hook is in the lowered position.

6. The vehicle restraint system of claim 1, wherein the scallop feature is configured to contact a portion of the rear impact guard bar of the vehicle when the restraint hook is engaged with the rear impact guard bar.

7. The vehicle restraint system of claim 1, further comprising a track assembly having a guide track configured to permit the carriage assembly to move vertically during engagement with the rear impact guard bar.

8. The vehicle restraint system of claim 7, wherein the carriage assembly is biased toward an upper position relative to the guide track, and wherein contact between the frame and the rear impact guard bar during engagement of the vehicle drives the carriage assembly away from the upper position against the bias.

9. The vehicle restraint system of claim 1, wherein the shank portion further includes—
   a lower surface opposite the upper surface, wherein the lower surface has a protruding portion extending away from the longitudinal axis.

10. The vehicle restraint system of claim 9, wherein the protruding portion has the same shape as the scallop feature such that a cross-section of the shank portion is constant along an axial length of the shank portion.

11. A vehicle restraint system for engaging a rear impact guard bar of a vehicle positioned at a loading dock, the vehicle restraint system comprising:
   a carriage assembly movably mountable to a face of the loading dock, the carriage assembly including—
      a frame; and
      an engagement member having—
         a body with a proximal end and a distal end, and
         a protrusion extending upwardly toward the distal end of the body, wherein the engagement member is rotatably coupled to the frame toward the proximal end of the body and pivotable about a pivot axis between a lowered position and a raised position, wherein the body has a longitudinal axis extending from the pivot axis toward the distal end,
      wherein, in the raised position, the engagement member is configured to engage a rear impact guard bar of a vehicle positioned at the loading dock,
      wherein the body further includes an upper surface having a first surface portion proximate the proximal end and a second surface portion proximate the distal end, wherein the first surface portion defines a plane and the second surface portion defines a recess extending inwardly from the plane, wherein the plane and the recess are positioned to one side of the longitudinal axis, and wherein the recess and the protrusion together define an engagement region.

12. The vehicle restraint system of claim 11, wherein the recess has a curved shape, a polygonal shape, a triangular shape, or a rectangular shape.

13. The vehicle restraint system of claim 11, wherein the frame includes a first side plate and a second side plate parallel to and spaced apart from the first side plate, wherein the first side plate and the second side plate each comprise a horizontal contact surface configured to contact the rear impact guard bar of the vehicle, and wherein the engagement member is positioned between the first side plate and the second side plate and recessed below the horizontal contact surfaces when the engagement member is in the lowered position.

14. The vehicle restraint system of claim 11, wherein the recess is configured to contact a portion of the rear impact guard bar of the vehicle when the engagement member is engaged with the rear impact guard bar.

15. The vehicle restraint system of claim 11, wherein the carriage assembly is biased toward an upper position relative to the track assembly.

16. The vehicle restraint system of claim 15, wherein contact between the frame and the rear impact guard bar during engagement of the vehicle drives the carriage assembly away from the upper position against the bias.

17. The vehicle restraint system of claim 11, wherein the body further includes—
a lower surface opposite the upper surface, and wherein the lower surface has a protruding portion extending away from the longitudinal axis.

18. The vehicle restraint system of claim 17, wherein the protruding portion has the same shape as the recess such that a cross-section of the body is constant along an axial length of the body.

* * * * *